(12) United States Patent
Wendling

(10) Patent No.: US 9,900,769 B2
(45) Date of Patent: Feb. 20, 2018

(54) METHODS AND SYSTEMS FOR ESTABLISHING AN ENCRYPTED-AUDIO SESSION

(71) Applicant: NAGRAVISION S.A., Cheseaux-sur-Lausanne (CH)

(72) Inventor: Bertrand Wendling, Divonne-les-Bains (FR)

(73) Assignee: NAGRAVISION S.A. (CH)

( * ) Notice: Subject to any disclaimer, the term of this patent is extended or adjusted under 35 U.S.C. 154(b) by 0 days.

(21) Appl. No.: 14/726,102

(22) Filed: May 29, 2015

(65) Prior Publication Data
US 2016/0353276 A1  Dec. 1, 2016

(51) Int. Cl.
*H04W 12/02* (2009.01)
*H04L 5/00* (2006.01)
(Continued)

(52) U.S. Cl.
CPC .......... *H04W 12/02* (2013.01); *H04B 1/3827* (2013.01); *H04K 1/00* (2013.01);
(Continued)

(58) Field of Classification Search
CPC ............... H04W 12/02; H04W 76/023; H04N 21/4367; H04N 21/41407; H04M 11/066;
(Continued)

(56) References Cited

U.S. PATENT DOCUMENTS 5,128,996 A   7/1992  Rosenow
5,150,410 A   9/1992  Bertrand
(Continued)

FOREIGN PATENT DOCUMENTS

CN   1585539    2/2005
CN   1283063    11/2006
(Continued)

OTHER PUBLICATIONS

Lefebvre Rob, "Set Incoming Calls to Headset or Speaker on Your iPhone With iOS 7 Beata [iOS Tips]", Jul. 2013, found on www.cultofmac.com.*

(Continued)

*Primary Examiner* — Peter Poltorak
(74) *Attorney, Agent, or Firm* — Invention Mine LLC

(57) ABSTRACT

An embodiment takes the form of a method carried out by a personal mobile device. The personal mobile device receives a session-request message requesting establishment an encrypted-audio session with a call-initiating device, responsively presents one or more call-response inquiries via a user interface, and subsequently receives an accessory-unready indication via the user interface. The one or more call-response inquiries include an accessory-status inquiry, and the accessory-unready indication is associated with the presented accessory-status inquiry. In response to receiving the accessory-unready indication, the personal mobile device sends, to the call-initiating device, a request-acknowledgment message that is associated with the session-request message. Subsequent to sending the request-acknowledgment message but before establishing the encrypted-audio session, the personal mobile device makes an accessory-ready determination. In response to making the accessory-ready determination, the personal mobile device establishes the encrypted-audio session.

16 Claims, 5 Drawing Sheets

(51) Int. Cl.
*H04W 76/02* (2009.01)
*H04B 1/3827* (2015.01)
*H04K 1/00* (2006.01)
*H04L 29/06* (2006.01)
*H04M 11/06* (2006.01)
*H04N 21/4367* (2011.01)
*H04N 21/414* (2011.01)

(52) U.S. Cl.
CPC ........ *H04L 5/0055* (2013.01); *H04L 29/0602* (2013.01); *H04M 11/066* (2013.01); *H04N 21/4367* (2013.01); *H04W 76/023* (2013.01); *H04N 21/41407* (2013.01)

(58) Field of Classification Search
CPC ..... H04L 29/0602; H04L 5/0055; H04K 1/00; H04B 1/3827
See application file for complete search history.

(56) References Cited

U.S. PATENT DOCUMENTS

| | | | |
|---|---|---|---|
| 5,535,276 | A | 7/1996 | Ganesan |
| 5,818,738 | A | 10/1998 | Effing |
| 5,825,878 | A | 10/1998 | Takahashi |
| 6,373,946 | B1 | 4/2002 | Johnston |
| 6,742,116 | B1 | 5/2004 | Matsui |
| 6,965,992 | B1 | 11/2005 | Joseph |
| 7,024,393 | B1 | 4/2006 | Peinado |
| 7,133,521 | B2 | 11/2006 | Jabri |
| 7,149,896 | B1 | 12/2006 | Bahl |
| 7,167,897 | B2 | 1/2007 | Riddle |
| 7,310,730 | B1 | 12/2007 | Champagne |
| 7,350,070 | B2 | 3/2008 | Smathers |
| 7,558,529 | B2 * | 7/2009 | Seshadri .............. H04M 1/6033 455/41.2 |
| 7,627,289 | B2 * | 12/2009 | Huddart ................. H04R 5/033 455/343.1 |
| 7,680,273 | B2 | 3/2010 | Whitehead |
| 7,734,802 | B1 | 6/2010 | Gay |
| 7,869,594 | B2 | 1/2011 | Tsurumoto |
| 8,103,210 | B2 * | 1/2012 | Tamura ............... H04M 1/6066 455/3.04 |
| 8,200,959 | B2 | 6/2012 | Wing |
| 8,228,861 | B1 | 7/2012 | Nix |
| 8,379,921 | B1 | 2/2013 | Golan |
| 8,477,661 | B2 | 7/2013 | Saleem |
| 8,738,916 | B2 | 5/2014 | Klassen |
| 8,761,184 | B1 * | 6/2014 | Ho ....................... H04L 12/4641 370/401 |
| 8,862,129 | B2 | 10/2014 | Moshir |
| 9,369,445 | B2 | 6/2016 | Mahajan |
| 9,569,638 | B2 | 2/2017 | Zatko |
| 2002/0002683 | A1 | 1/2002 | Benson |
| 2002/0058515 | A1 | 5/2002 | Holler |
| 2002/0093948 | A1 * | 7/2002 | Dertz .................. H04L 12/5695 370/355 |
| 2002/0098878 | A1 * | 7/2002 | Mooney ..................... G08B 1/08 455/569.1 |
| 2002/0122401 | A1 * | 9/2002 | Xiang ................. H04W 76/026 370/338 |
| 2003/0018705 | A1 * | 1/2003 | Chen .................... H04L 12/589 709/202 |
| 2003/0046539 | A1 | 3/2003 | Negawa |
| 2003/0054865 | A1 * | 3/2003 | Byers .................... H04M 1/642 455/567 |
| 2003/0059005 | A1 | 3/2003 | Meyerson |
| 2003/0088618 | A1 | 5/2003 | Sueyoshi |
| 2003/0235308 | A1 | 12/2003 | Boynton |
| 2004/0109409 | A1 * | 6/2004 | Simpson ................ H04M 3/4938 370/229 |
| 2005/0073575 | A1 | 4/2005 | Thacher |
| 2005/0154793 | A1 | 7/2005 | Khartabil |
| 2005/0154973 | A1 * | 7/2005 | Otsuka ............. G06F 17/30787 715/201 |
| 2005/0198379 | A1 | 9/2005 | Panasyuk |
| 2005/0198380 | A1 | 9/2005 | Panasyuk |
| 2005/0273510 | A1 | 12/2005 | Schuh |
| 2006/0050883 | A1 | 3/2006 | Walker |
| 2006/0101288 | A1 | 5/2006 | Smeets |
| 2006/0165060 | A1 | 7/2006 | Dua |
| 2006/0198520 | A1 | 9/2006 | Courtney |
| 2007/0018334 | A1 | 1/2007 | Peytavy |
| 2007/0047711 | A1 * | 3/2007 | Florkey .............. H04M 3/4285 379/162 |
| 2007/0263798 | A1 * | 11/2007 | Dewing ............ H04L 29/06027 379/88.13 |
| 2007/0294346 | A1 | 12/2007 | Moore |
| 2008/0010674 | A1 | 1/2008 | Lee |
| 2008/0034421 | A1 | 2/2008 | Ahn |
| 2008/0037447 | A1 | 2/2008 | Garg |
| 2008/0046731 | A1 | 2/2008 | Wu |
| 2008/0130894 | A1 | 6/2008 | Qj |
| 2008/0146290 | A1 * | 6/2008 | Sreeram .............. H04M 1/6066 455/569.1 |
| 2008/0171579 | A1 * | 7/2008 | Grubek ............. H04M 1/72533 455/563 |
| 2008/0263363 | A1 | 10/2008 | Jueneman |
| 2009/0097628 | A1 * | 4/2009 | Yap ........................ H04M 3/50 379/202.01 |
| 2009/0147958 | A1 | 6/2009 | Calcaterra |
| 2009/0150668 | A1 | 6/2009 | Liu |
| 2009/0168978 | A1 * | 7/2009 | Laws .................. H04M 3/4285 379/93.17 |
| 2009/0296932 | A1 * | 12/2009 | Pilavic ..................... H04K 1/00 380/255 |
| 2010/0217982 | A1 | 8/2010 | Brown |
| 2011/0047383 | A1 * | 2/2011 | Klassen .............. G06Q 20/347 713/171 |
| 2011/0150216 | A1 | 6/2011 | Barry |
| 2011/0251899 | A1 * | 10/2011 | Proulx .................... G06Q 30/02 705/14.64 |
| 2012/0005475 | A1 | 1/2012 | Inagaki |
| 2012/0198531 | A1 | 8/2012 | Ort |
| 2012/0204029 | A1 | 8/2012 | Trabucco |
| 2012/0252531 | A1 | 10/2012 | King |
| 2012/0257750 | A1 | 10/2012 | Bohm |
| 2012/0258726 | A1 * | 10/2012 | Bansal .............. H04M 1/72563 455/456.1 |
| 2012/0291095 | A1 | 11/2012 | Narendra |
| 2013/0170361 | A1 | 7/2013 | Manyakin |
| 2013/0252583 | A1 | 9/2013 | Brown |
| 2013/0273889 | A1 | 10/2013 | Lobmaier |
| 2013/0336161 | A1 * | 12/2013 | Jung ................... H04W 76/023 370/254 |
| 2013/0339754 | A1 | 12/2013 | Takashima |
| 2014/0033279 | A1 | 1/2014 | Nimashakavi |
| 2014/0033280 | A1 | 1/2014 | Nimashakavi |
| 2014/0280982 | A1 * | 9/2014 | Patel .................... H04L 65/1006 709/227 |
| 2014/0301249 | A1 * | 10/2014 | Moss .................. H04L 65/1069 370/260 |
| 2015/0031288 | A1 | 1/2015 | Tubbesing |
| 2015/0059251 | A1 | 3/2015 | Rinner |
| 2015/0089569 | A1 | 3/2015 | Sondhi |
| 2015/0222601 | A1 | 8/2015 | Metz |
| 2015/0365400 | A1 * | 12/2015 | Cox ................... H04L 63/0823 726/7 |
| 2016/0234356 | A1 | 8/2016 | Thomas |

FOREIGN PATENT DOCUMENTS

| | | |
|---|---|---|
| CN | 101340433 | 7/2009 |
| EP | 1863301 | 2/2010 |
| EP | 2175580 | 4/2010 |
| EP | 2262143 | 12/2010 |
| GB | 2388279 | 11/2003 |
| GB | 2420251 | 5/2006 |
| WO | 2008129546 | 10/2008 |

(56) References Cited

FOREIGN PATENT DOCUMENTS

| WO | 2012024903 | 3/2012 |
|----|------------|--------|
| WO | 2013121275 | 8/2013 |

OTHER PUBLICATIONS

Notification of Transmittal of the International Search Report and the Written Opinion of the International Searching Authority, or the Declaration, for PCT/EP2016/062375, dated Sep. 8, 2016, 12 pages.
Petersen, M., "Voice and Data Encryption Module for Attachment to Portable Cellular Telephone", Motorola Technical Developments, Motorola Inc., Schaumburg, IL, US, vol. 38, Jun. 1, 1991, pp. 32-34 XP000906022, ISSN: 0887-5286.
Chumchu, P., et al., "A simple and Cheap End-to-End Voice Encryption Framework over GSM-based networks", Computing, Communications and Applications Conference (Comcomap), 2012, IEEE, Jan. 11, 2012, XPO32117819, DOI: 10.1109/COMCOMAP. 2012.6154800, ISBN: 978-1-4577-1717-8.
International Search Report and Written Opinion for PCT/EP2016/061966 dated Aug. 19, 2016, 10 pages.
Menezes, et al., "Handbook of Applied Cryptography", 1997, ISBN: 0848385237.
Lefebvre, R., Set Incoming Calls to Headset or Speaker on Your iPhone With iOS 7 Beata [iOS Tips]:, Jul. 2013, found on www.cultofmac.com.
Jabra Product Guide. 2009.
International Search Report and Written Opinion for PCT/EP2016/062578 dated Aug. 4, 2016, 8 pages.
Notification of Transmittal of the International Search Report and the Written Opinion of the International Searching Authority, or the Declaration, for PCT/EP2016/061975, dated Jul. 1, 2016, 11 pages.
Menezes, et al. Handbook of Applied Cryptography, 1996, XP001525001.

\* cited by examiner

METHODS AND SYSTEMS FOR ESTABLISHING AN ENCRYPTED-AUDIO SESSION

BACKGROUND

People communicate wirelessly and on the go. Among the devices that make this possible are those sometimes referred to as personal mobile devices. Examples of personal mobile devices include cell phones, smartphones, walkie-talkies, and portable hotspots, among others. A personal mobile device could be handheld (as may be the case for a walkie-talkie), body-mounted, or attached to a vehicle (such as the roof of a car), as examples.

Given the relative ease with which radio signals can be intercepted, communication with (or between) personal mobile devices is often encrypted to prevent interception of the communication by third parties. Encryption is the process of converting audible voice or other data into unintelligible voice, while decryption is the process of converting the unintelligible voice back to the original audible voice. The respective algorithms used for encryption and decryption are often referred to collectively as a cipher. Examples of common ciphers include Advanced Encryption Standard (AES), Blowfish, Triple Data Encryption Algorithm (3DES), and RC4, among numerous others.

A given cipher typically uses one or more cryptographic keys for encryption and decryption. Common examples of cryptographic keys include passwords, digital certificates, and random and/or pseudo-random data. Any party (including a third party) with access to a cryptographic key used to encrypt a given plaintext may be able to decrypt the unintelligible voice; therefore, for encryption to be effective, the cryptographic key should be known only to the sender and receiver. Encryption and decryption may take place in a secure element that is external to the personal mobile device.

OVERVIEW

Disclosed herein are systems and methods for establishing an encrypted-audio session. At least one embodiment takes the form of a method carried out by a personal mobile device. The personal mobile device receives a session-request message requesting establishment an encrypted-audio session with a call-initiating device, responsively presents one or more call-response inquiries via a user interface, and subsequently receives an accessory-unready indication via the user interface. The one or more call-response inquiries include an accessory-status inquiry, and the accessory-unready indication is associated with the presented accessory-status inquiry. In response to receiving the accessory-unready indication, the personal mobile device sends, to the call-initiating device, a request-acknowledgment message that is associated with the session-request message. Subsequent to sending the request-acknowledgment message but before establishing the encrypted-audio session, the personal mobile device makes an accessory-ready determination. In response to making the accessory-ready determination, the personal mobile device establishes the encrypted-audio session.

At least one embodiment the form of a personal mobile device that includes a communication interface, a user interface, a processor, and data storage containing instructions executable by the processor for causing the personal mobile device to carry out at least the functions described in the preceding paragraph. Moreover, any of the variations and permutations described in the ensuing paragraphs and anywhere else in this disclosure can be implemented with respect to any embodiments, including with respect to any method embodiments and with respect to any system embodiments.

In at least one embodiment, making the accessory-ready determination includes receiving an accessory-ready indication via the user interface.

In at least one embodiment, making the accessory-ready determination includes determining that a communication link with an accessory is established. In at least one such embodiment, making the accessory-ready determination further includes receiving an accessory-ready indication via the established communication link.

In at least one embodiment, making the accessory-ready determination includes receiving an accessory-ready indication via an accessory user interface.

In at least one such embodiment, the accessory user interface includes a touch display, and receiving the accessory-ready indication via the accessory user interface includes receiving the accessory-ready indication via the touch display of the accessory user interface.

In at least one other such embodiment, the accessory user interface includes a push button, and receiving the accessory-ready indication via the accessory user interface includes receiving the accessory-ready indication via the push button of the accessory user interface.

In at least one embodiment, the one or more presented call-response inquiries further includes a call-accept inquiry. The personal mobile device receives a call-accept indication via the user interface. The call-accept indication is associated with the presented call-accept inquiry. In response to receiving the accept indication, the personal mobile device establishes the encrypted-audio session.

In at least one embodiment, the one or more presented call-response inquiries further includes a call-reject inquiry. The personal mobile device receives a call-reject indication via the user interface. The call-reject indication is associated with the presented call-reject inquiry. In response to receiving the call-reject indication, the personal mobile device sends a request-rejection message to the call-initiating device. The request-rejection message is associated with the session request.

In at least one such embodiment, the request-rejection message includes a request-rejection-reason indication. In at least one such embodiment, the request-rejection-reason indication includes an indication that a called party is at an unsecured location. In at least one other such embodiment, the request-rejection-reason indication includes an indication that a called-party's accessory is unavailable for the requested encrypted-audio session.

The above overview is provided by way of example and not limitation, as those having ordinary skill in the relevant art may well implement the disclosed systems and methods using one or more equivalent components, structures, devices, and the like, and may combine and/or distribute certain functions in equivalent though different ways, without departing from the scope and spirit of this disclosure.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

DETAILED DESCRIPTION

The present systems and methods will now be described with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out of one or more of the functions described herein.

Figure 1:
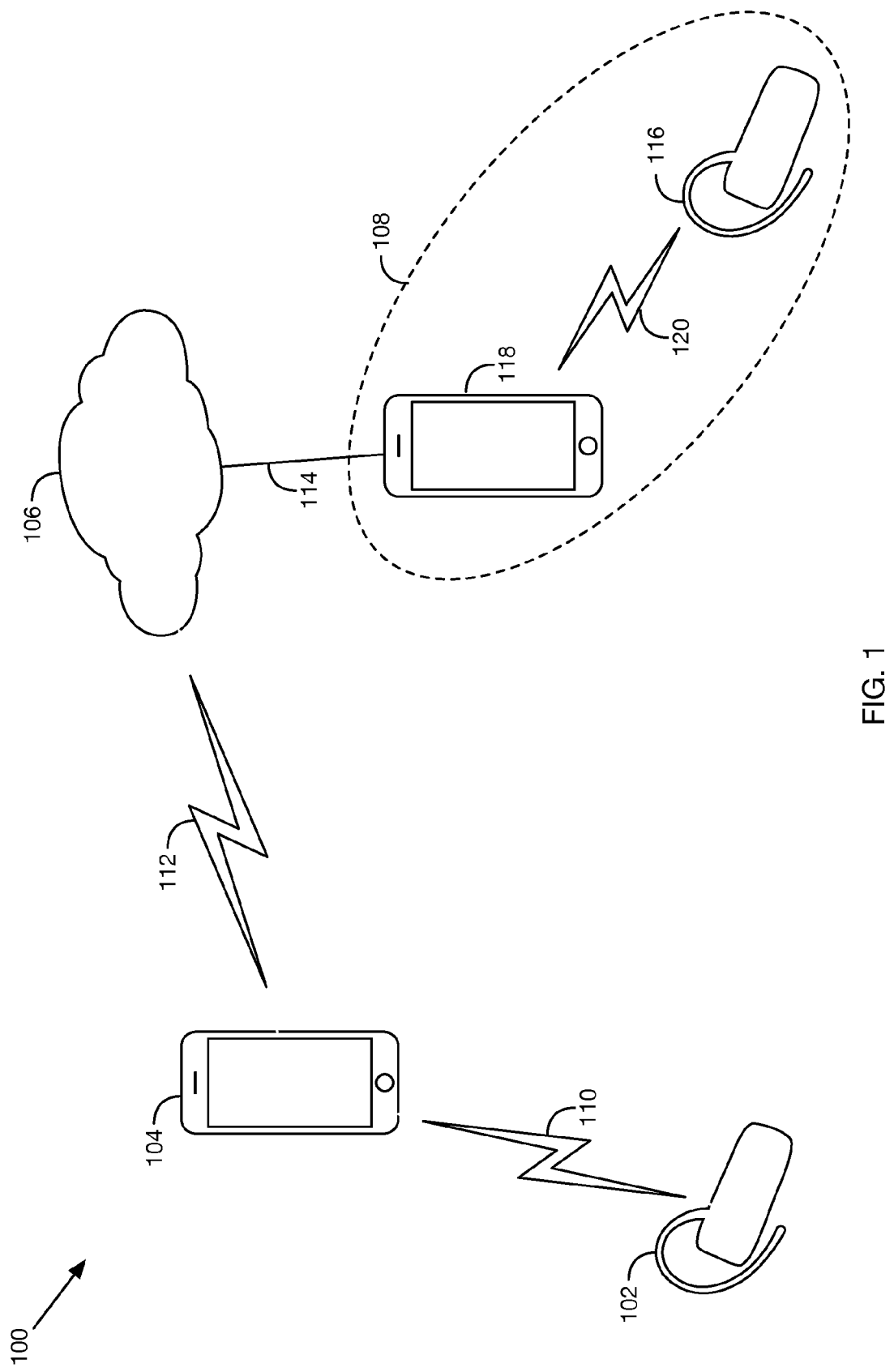
FIG. 1 depicts a communication system, in accordance with at least one embodiment.

FIG. 1 depicts a communication system, in accordance with at least one embodiment. As shown, a communication system 100 includes a called-party accessory 102, a personal mobile device 104, a data network 106, and a call-initiating device 108. Those of skill in the art will appreciate that communication system 100 could include different and/or additional entities.

Called-party accessory 102 could take the form of (or include) a headset, a video camera, a digital camera, a keyboard, a display screen, and/or any other device capable of obtaining user input and/or providing an output, as is known to one of skill in the art.

Personal mobile device 104 and/or call-initiating device 108 may be any suitable respective devices (or combination of respective devices) equipped, programmed, or configured to communicate over a data network (such as data network 106). Such devices may include, but are not limited to, mobile phones/smart phones, laptop computers, desktop computers, portable media players, smartwatches, and/or tablet computers, among other possible devices as known to one of skill in the art.

In some embodiments, communication link 110 includes one or more wired-communication links (e.g., one or more Ethernet connections, one or more Universal Serial Bus (USB) connections, and/or the like) and/or one or more wireless-communication links (e.g., one or more wireless local area network (WLAN) (e.g., Wi-Fi) links, and/or one or more Bluetooth links. It is also possible that communication link 110 itself include one or more half- or full-duplex wireless communication links. Moreover, communication link 110 may include one or more communication networks of any type deemed suitable by those of skill in the relevant art for a given context. And certainly numerous other configurations are possible as well.

In some embodiments, communication link 112 includes on ore more wireless-communications links (Wi-Fi links), one or more wireless wide area network (WWAN) (e.g., Long Term Evolution (LTE)) links), and/or the like. It is also possible that communication link 112 itself includes one or more half- or full-duplex wireless communication links. Moreover, communication link 112 may include one or more communication networks of any type deemed suitable by those of skill in the relevant art for a given context. And certainly numerous other configurations are possible as well.

Call-initiating device 108 may be any suitable device (or combination of devices) configured to perform the call-initiating-device functions described herein. In the embodiment illustrated in FIG. 1, call-initiating device 108 takes the form of a call-initiating personal mobile device 118 and a call-initiating accessory 116 that are communicatively connected via a communication link 120. Accessory 116, device 118, and communication link 120 may be similar in function and/or structure to accessory 102, device 104, and communication link 110 (respectively), as examples.

In the communications system 100, the call-initiating device 108 sets up an encrypted-audio session with the personal mobile device 104 via the data network 106. In at least one embodiment, after the encrypted-audio session has been accepted, voice information is encrypted within called party accessory 102, and the encrypted data is sent to the personal mobile device 104 via communications link 110. The personal mobile device 104 sends this encrypted data to the data network 106 via communications link 112. The data network 106 then sends the encrypted data to the call-initiating device 108 via communications link 114.

Figure 2:
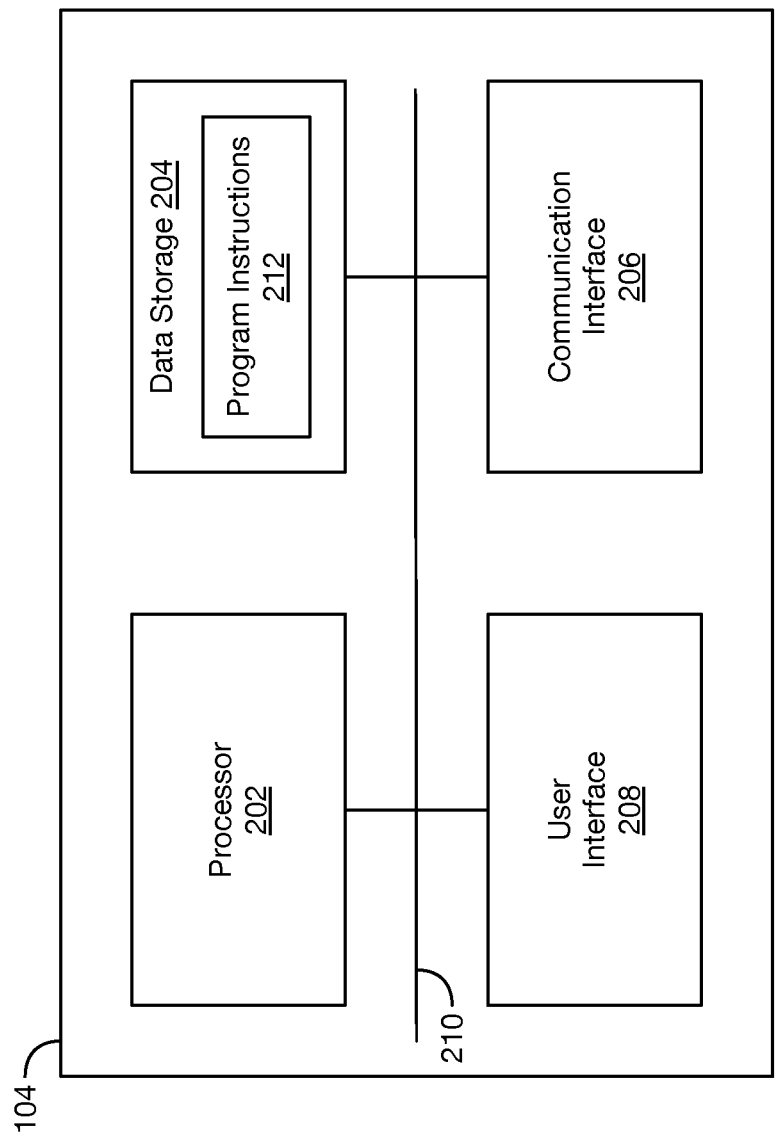
FIG. 2 depicts a block diagram of a personal mobile device, in accordance with at least one embodiment.

FIG. 2 depicts a block diagram of a personal mobile device, in accordance with at least one embodiment. As shown, personal mobile device 104 includes a processor 202, data storage 204, a communication interface 206, and user interface 208, each of which are interconnected via a system bus 210. Those having skill in the relevant art will appreciate that personal mobile device 104 could have additional and/or different components, and perhaps a different arrangement of components, among many other possible variations that could be listed here, and that call-initiating device 108 could take a form similar to that of personal mobile device 104.

Processor 202 may include one or more processors of any type deemed suitable by those of skill in the relevant art, some examples including a microprocessor and a dedicated digital signal processor (DSP).

Data storage 204 may take the form of any non-transitory computer-readable medium or combination of such media, some examples including flash memory, read-only memory (ROM), and random-access memory (RAM) to name but a few, as any one or more types of non-transitory data-storage technology deemed suitable by those of skill in the relevant art could be used. As depicted in FIG. 2, data storage 204 contains program instructions 212 executable by processor 202 for carrying out various functions, though data storage 204 may contain different and/or additional data (such as one or more cryptographic keys).

In an embodiment in which personal mobile device 104 is configured to carry out one or more processes and/or functions (such as the processes and functions described with reference to FIG. 3), program instructions 212 are executable by processor 202 for carrying out those functions. In instances where other entities described herein have a structure similar to that of the example personal mobile device 104 that is described in connection with at least FIG. 2, the respective program instructions 212 stored by the respective data storages 204 of those respective devices are executable by their respective processors 202 to carry out functions performed by those devices.

Communication interface 206 may include (i) one or more wireless-communication interfaces for communicating according to one or more of the wireless-communication types and/or protocols mentioned above, and/or one or more other types and/or protocols deemed suitable by those having skill in the relevant art for a given implementation or in a given context and/or (ii) one or more wired-communication interfaces for communicating according to one or more types and/or protocols such as Ethernet, USB, and the like, and/or one or more other types and/or protocols deemed suitable by those having skill in the relevant art for a given implementation or in a given context. As such, communication interface 206 may include any necessary hardware (e.g., chipsets, antennas, Ethernet cards, etc.), any necessary firmware, and any necessary software for conducting one or more forms of communication with one or more other entities.

User interface 208 could include a touchscreen such as a capacitive touch display, a pressure-sensitive touch display, or any other touch-sensitive display. In some embodiments, the user interface includes a keyboard, which in turn could include one or more physical keys, touch keys, alphabet keys, and/or specific command keys. A user-interface microphone could take the form of (or include) a condenser microphone, a dynamic microphone, a ribbon microphone, a carbon microphone, a piezoelectric microphone, a fiber optic microphone, a laser microphone, a liquid microphone, a MEMS microphone, and/or any other type of microphone. As another possibility, user interface 208 may include one or more buttons or switches. Those of skill in the art will appreciate that user interface 208 could include any combination of these and/or other user-interface elements.

Figure 3:
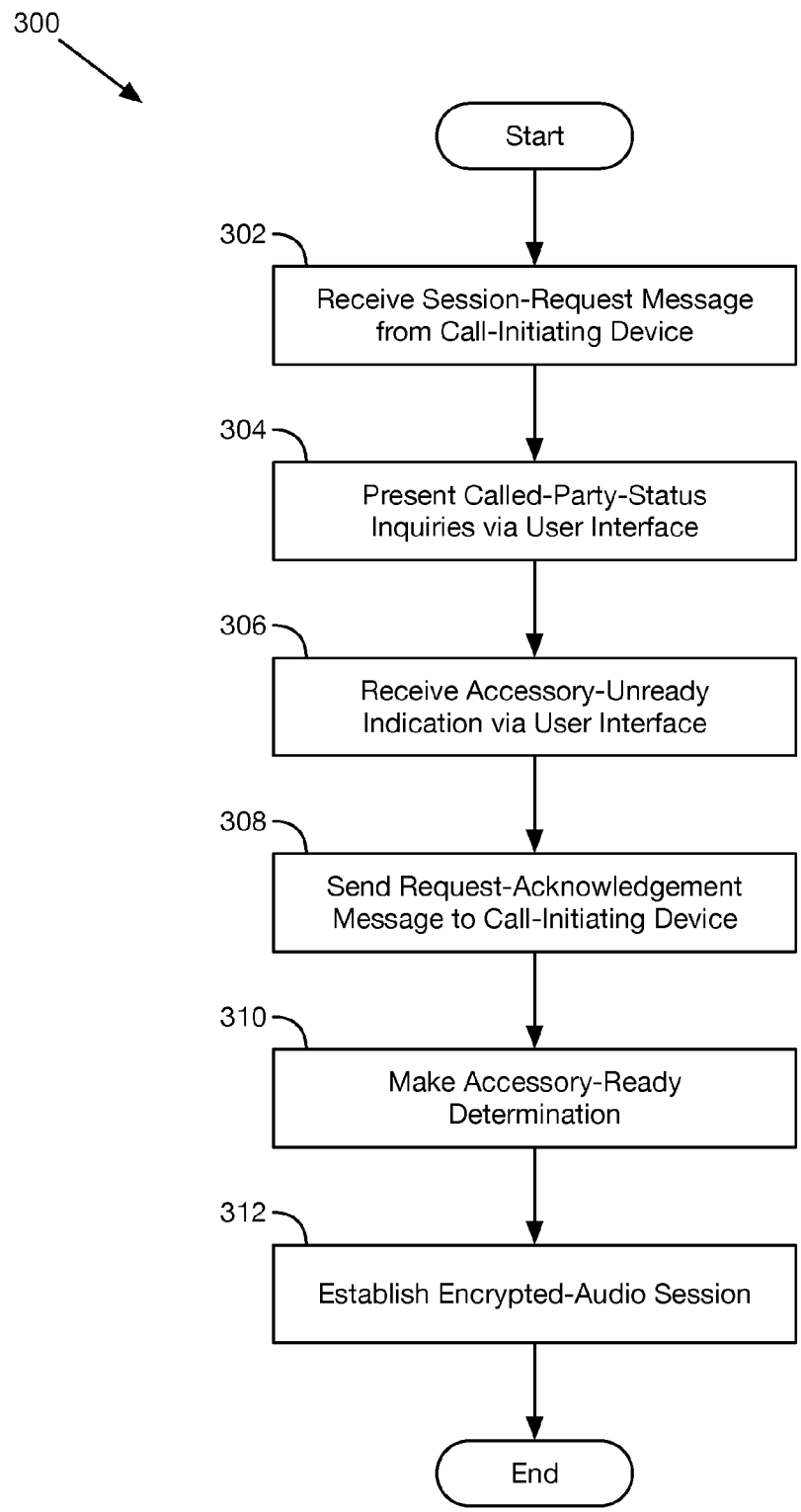
FIG. 3 depicts a flowchart of a method carried out by a personal mobile device, in accordance with at least one embodiment.

FIG. 3 depicts a flowchart of a method carried out by a personal mobile device, in accordance with at least one embodiment. As shown, method 300 begins at step 302 with personal mobile device 104 receiving a session-request message to establish an encrypted-audio session with call-initiating device 108.

Personal mobile devices 104 may receive the session-request message from call-initiating device 108, from a public-branch exchange (PBX), from an Internet protocol PBX (IP-PBX), from an entity conducting third-party call control (e.g., on behalf of call-initiating device 108), and/or any other suitable entity. The session-request message could be received via data network 106.

The session-request message could take the form of a call-origination message, a Session Initiation Protocol (SIP) message, a Real-time Transport Protocol (RTP) message, a Secure RTP (SRTP) message, a ZRTP message, an H.323 message, an Inter-Asterisk eXchange (IAX) message, and/or an IAX2 message, among many other possibilities that will be apparent to those of skill in the art.

The session-request message could include metadata related to the message and/or the requested media session. The metadata could take the form of (or include) an identifier associated with the session-request message, an identifier associated with the requested message, a source identifier and/or destination identifier (such as a telephone number, an Internet protocol (IP) address, and/or a uniform resource identifier (URI)), and/or any combination of these, among other possibilities.

At step 304, and in response to receiving the session-request message at step 302, personal mobile device 104 presents one or more call-response inquiries via user interface 208. The one or more presented call-response inquiries include an accessory-status inquiry.

Figure 4:
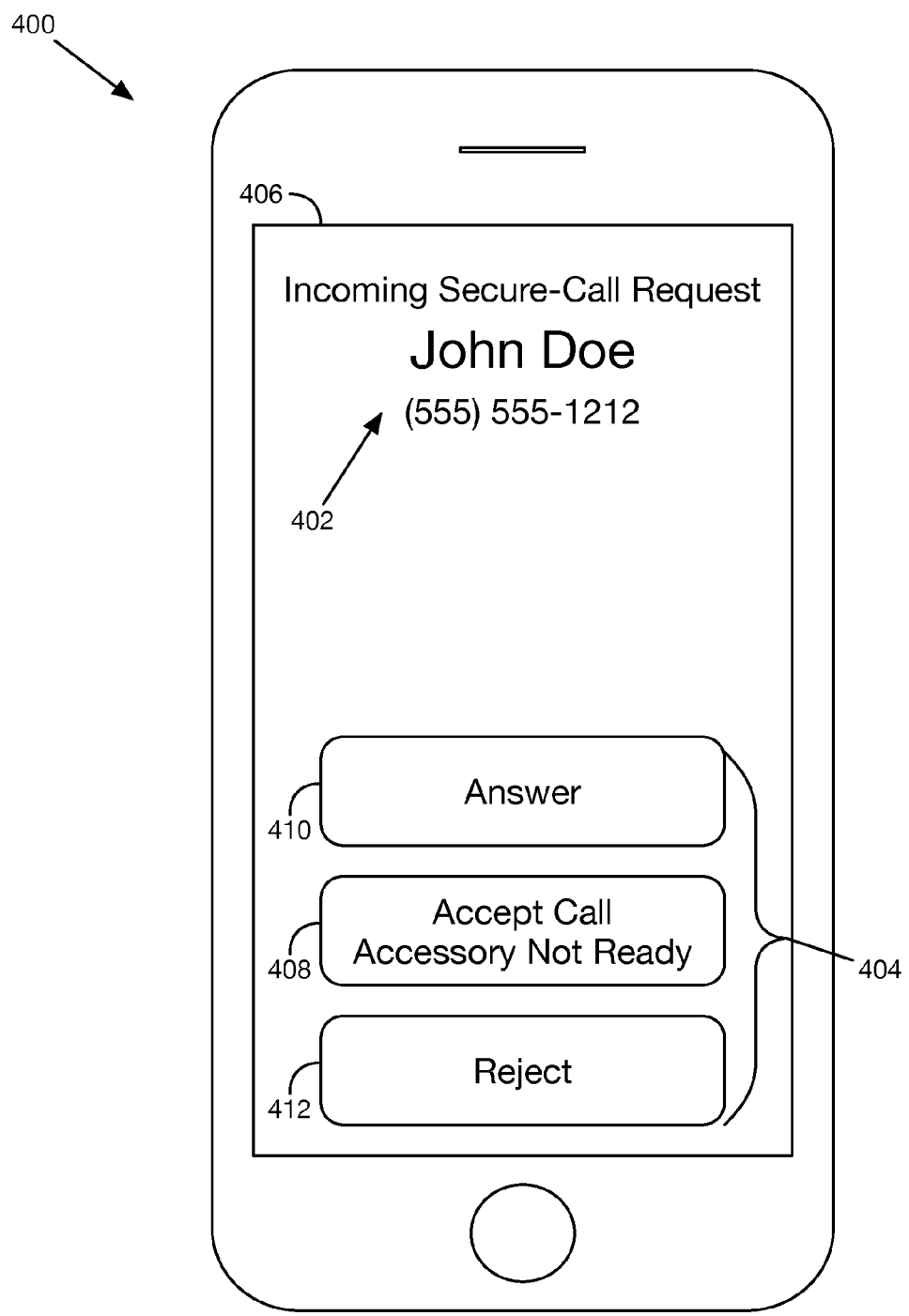
FIG. 4 depicts a user-interface presentation of call-response inquiries.

FIG. 4 depicts a user-interface presentation of call-response inquiries, in accordance with at least one embodiment. As shown, user-interface presentation 400 via a touchscreen 406 of user interface 208 includes presentation of a call notification 402 and a set 404 of call-response inquiries. Set 404 of call-response inquiries includes an accessory-unready inquiry 408, a call-accept inquiry 410 and a call-reject inquiry 412. It should be noted that set 404 of call-response inquiries could include additional and/or different inquiries.

Though FIG. 4 depicts set 404 of call-response inquiries as being presented via touchscreen 406 of user interface 208, those of skill in the art will appreciate that the call-response inquiries could be presented in other ways. For example, user interface 208 could include a loudspeaker, and presenting the call-response inquiries could include providing spoken call-response inquiries (e.g., using text-to-speech functionality) via the loudspeaker.

At step 306, personal mobile device 104 receives an accessory-unready indication via user interface 208. The received accessory-unready indication is associated with the accessory-status inquiry. To illustrate, the accessory-unready indication may be received while personal mobile device 104 is displaying one or more call-response inquires via a display of user interface 208. As another possibility, the accessory-unready indication may be received subsequent to personal mobile device 104 audibly presenting a respective call-response inquiry via a microphone of user interface 208. The accessory-unready indication may be received via a touch display, a microphone, and/or any other element of user interface 208.

At step 308, and in response to receiving the accessory-unready indication, personal mobile device 104 sends a request-acknowledgment message to call-initiating device 108. The request-acknowledgment message could take the form of a SIP message, among other examples that are described herein or that will be known to those of skill in the art.

The request-acknowledgment message is associated with the session-request message received at step 302. To illustrate, the request-acknowledgment message could include an identification of the received session-request message and/or an identification of the requested encrypted-audio session, as examples. Such association may be manifested in other ways as well.

In response to receiving the accessory-unready indication, personal mobile device 104 may also establish one or more communication links with call-initiating device 108—e.g., for use with any later-established encrypted-audio session. Establishing the one or more communication links could include, for example, establishing a media session (such as an RTP session, an SRTP session, a ZRTP session, etc.) with call-initiating device 108, but refraining from exchanging media with call-initiating device 108 via the media session until, for example, making an accessory-ready determination.

At step 310, subsequent to sending the request-acknowledgment message at step 308 but before establishing the encrypted-audio session, personal mobile device 104 makes an accessory-ready determination.

Making the accessory-ready determination could include receiving an accessory-ready indication via user interface 208. For example, subsequent to receiving the accessory-unready indication at step 306, personal mobile device 104 may present a follow-up accessory-status inquiry via user interface 208, and making the accessory-ready determination could include receiving, via user interface 208, an accessory-ready indication that is associated with the follow-up accessory-status inquiry.

Additionally or alternatively, making the accessory-ready determination could include determining that a communication link is established with an accessory. This communication link could include a Bluetooth link or other wireless link between the accessory and personal mobile device 104, for example. In another embodiment, the communication link is a wired connection between the accessory and personal mobile device 104—e.g., via a headphone jack or a USB port. Those of skill in the art will appreciate that other methods are possible for determining that a communication link is established with an accessory.

Making the accessory-ready determination could further include receiving an accessory-ready indication via the established communication link. In an embodiment, personal mobile device 104 receives, from the accessory via an established communication link, a Bluetooth message indicating that a connection between the two devices has been established successfully. In another embodiment, personal mobile device 104 receives a message from the accessory via a wired connection, the message indicating that a connection between the respective devices has been established. Receiving an accessory-ready indication via an established communication link could take other forms.

Making the accessory-ready determination could include receiving an accessory-ready indication from an accessory. Receiving the accessory-ready indication from the accessory could include receiving the accessory-ready indication via an accessory user interface.

Figure 5:
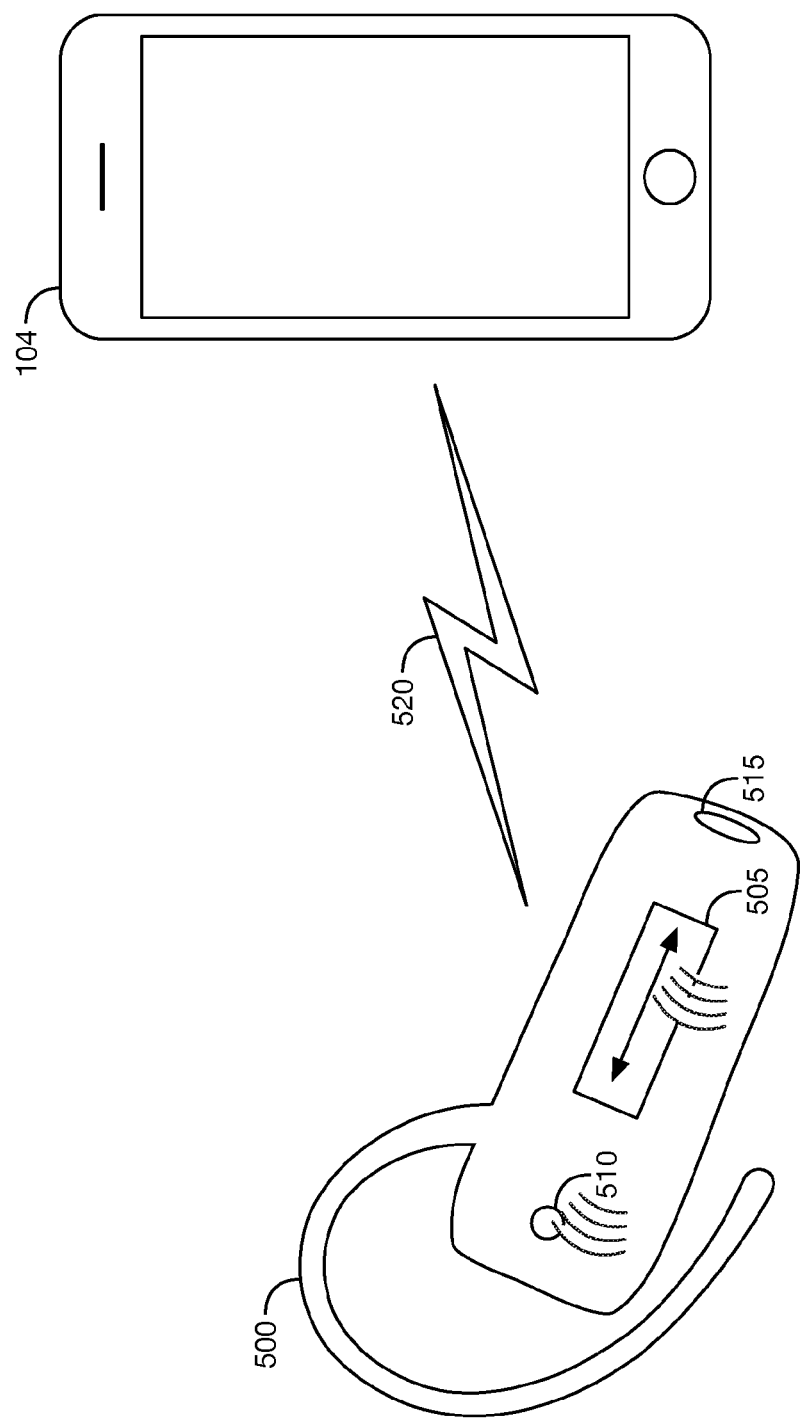
FIG. 5 depicts an accessory, in accordance with at least one embodiment.

FIG. 5 depicts an accessory, in accordance with at least one embodiment. As shown, an accessory 500 includes a touch display 505, a push button 510, and a microphone 515, any of which may function as described with respect to the user-interface elements of personal mobile device 104, for example. Receiving the accessory-ready indication via the accessory user interface could include receiving an indication that an accessory-ready confirmation was obtained by the accessory via touch display 505. The obtained accessory-ready confirmation could correspond to a user tapping touch display 505 and/or swiping a finger along the touch display. User could also press push button 510 to provide an accessory-ready indication. In an embodiment, receiving the accessory-ready indication via the accessory user interface includes receiving an indication that an accessory-ready confirmation was obtained by the accessory push button 510 (the confirmation correspond to a push of the button, for example) and/or via microphone 515 (the confirmation perhaps corresponding to a word or phrase). In an embodiment, the accessory-ready indication is received via a communication link 520 between personal mobile device 104 and accessory 500. Receiving an accessory-ready indication via an accessory user interface could take other forms that will be apparent to those of skill in the art.

At step 312, and in response to making the accessory-ready determination, personal mobile device 104 establishes the encrypted-audio session.

Establishing the encrypted-audio session may include, for example, establishing a media session with call-initiating device 108 (e.g., as described with respect to step 308) and exchanging encrypted-audio media with call-initiating device 108 via the media session. If a media session with call-initiating device 108 is already established when personal mobile device 104 makes the accessory-ready determination, establishing the encrypted-audio session may include commencing exchange of encrypted-audio media via the media session.

In some embodiments, personal mobile device may receive a call-response indication in addition to the accessory-unready indication received at step 306. An indication that call-accept inquiry 410 was selected may cause personal mobile device 104 to establish the secure call immediately. In such an embodiment, making the accessory-ready determination at step 310 could include receiving an indication that call-accept inquiry 410 was selected. As another possibility, receiving an indication that call-reject inquiry 406 was selected may cause personal mobile device 104 to send a request-rejection message to call-initiating device 108. In at least one embodiment, the request-rejection message includes a request-rejection-reason indication, which could take the form of (or include) an indication that the called party is at an unsecured location, is at a crowded place, and/or is in a meeting, among numerous other possibilities. For example, if the called party is in a crowded place, then secured communications may not be possible, as people within the crowded place may be able to overhear any conversation between the parties of a call. If the called party is in a meeting, other meeting attendees may be able to overhear the conversation. Or the called-party may not want to have the called-party accessory out in plain sight, as someone may attempt to steal it.

Although features and elements are described above in particular combinations, those having ordinary skill in the art will appreciate that each feature or element can be used alone or in any combination with the other features and elements without departing from the scope and spirit of the present disclosure.

What is claimed is:

1. A method carried out by a personal mobile device having a user interface, the method comprising:
   receiving a session-request message requesting establishment of an encrypted-audio session with a call-initiating device;
   in response to receiving the session-request message, presenting one or more call-response inquiries via the user interface, the one or more call-response inquiries comprising an accessory-status inquiry with respect to an accessory to the personal mobile device, in addition to a call-accept inquiry and a call-reject inquiry;
   receiving an accessory-unready indication with respect to the accessory via the user interface, the accessory-unready indication being associated with the presented accessory-status inquiry;
   in response to receiving the accessory-unready indication, sending a request-acknowledgment message to the call-initiating device, the request-acknowledgment message being associated with the session-request message;
   making an accessory-ready determination with respect to the accessory, wherein the encrypted-audio session is thereafter established; and
   during the encrypted-audio session, receiving encrypted-audio data from the accessory and forwarding that encrypted-audio data to the call-initiating device.

2. The method of claim 1, wherein making the accessory-ready determination comprises receiving an accessory-ready indication with respect to the accessory via the user interface.

3. The method of claim 1, wherein making the accessory-ready determination comprises determining that a communication link is established between the accessory and the personal mobile device.

4. The method of claim 3, wherein making the accessory-ready determination further comprises receiving an accessory-ready indication with respect to the accessory via the established communication link.

5. The method of claim 1, wherein making the accessory-ready determination comprises receiving an accessory-ready indication with respect to the accessory via an accessory user interface of the accessory.

6. The method of claim 5, wherein the accessory user interface comprises a touch display, wherein receiving the accessory-ready indication via the accessory user interface comprises receiving the accessory-ready indication via the touch display of the accessory user interface.

7. The method of claim 5, wherein the accessory user interface comprises a push button, wherein receiving the accessory-ready indication via the accessory user interface comprises receiving the accessory-ready indication via the push button of the accessory user interface.

8. The method of claim 1 further comprising:
receiving a call-accept indication via the user interface, the call-accept indication being associated with the presented call-accept inquiry, and
in response to receiving the call-accept accept indication, establishing the encrypted-audio session.

9. The method of claim 1, further comprising establishing the encrypted-audio session in response to making the accessory-ready determination.

10. A system personal mobile device comprising:
memory,
a communication interface configured to receive a session-request message to establish an encrypted-audio session with a call-initiating device;
a user interface configured to:
present, in response to the communication interface receiving the session-request message, one or more call-response inquiries, the one or more call-response inquiries comprising an accessory-status inquiry with respect to an accessory to the personal mobile device; and
receive an accessory-unready indication with respect to the accessory, the accessory-unready indication being that is associated with the presented accessory-status inquiry, in addition to a call-accept inquiry and a call-reject inquiry,
wherein the communication interface is further configured to provide, in response to the user interface receiving the accessory-unready indication, a request acknowledgment message to the call-initiating device, the request-acknowledgment message being associated with the session-request message; and
a processor configured to:
make an accessory-ready determination with respect to the accessory, wherein the encrypted-audio session is thereafter established; and
receive, via the communication interface, encrypted-audio data from the accessory during the encrypted-audio session and forward, via the communication interface, that encrypted-audio data to the call-initiating device.

11. The personal mobile device of claim 10, wherein the processor is further configured to make the accessory-ready determination at least in part by receiving an accessory-ready indication with respect to the accessory via the user interface.

12. The personal mobile device of claim 10, wherein the processor is further configured to make the accessory-ready determination at least in part by determining that a communication link is established between the accessory and the personal mobile device.

13. The personal mobile device of claim 12, wherein the processor is further configured to make the accessory-ready determination by receiving an accessory-ready indication with respect to the accessory via the established communication link.

14. The personal mobile device of claim 13, wherein the accessory-ready indication is received via an accessory user interface of the accessory.

15. The personal mobile device of claim 14, wherein the accessory user interface comprises inputs used to determine the accessory-ready indication, the inputs being selected from the group consisting of a touch display and a push button.

16. The personal mobile device of claim 10, wherein the processor is further configured to establish the encrypted-audio session in response to making the accessory-ready determination.

\* \* \* \* \*